US010410189B2

(12) United States Patent
Rezayee et al.

(10) Patent No.: US 10,410,189 B2
(45) Date of Patent: Sep. 10, 2019

(54) SCANNING SYSTEM WITH DIRECT ACCESS TO MEMORY

(71) Applicant: Square, Inc., San Francisco, CA (US)

(72) Inventors: Afshin Rezayee, Richmond Hill (CA); Mary Kay Bowman, Lincroft, NJ (US); Christopher Rohlf, Seattle, WA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/721,872

(22) Filed: Sep. 30, 2017

(65) Prior Publication Data

US 2019/0102760 A1   Apr. 4, 2019

(51) Int. Cl.
*G07F 7/10* (2006.01)
*G07F 7/08* (2006.01)
(Continued)

(52) U.S. Cl.
CPC ........... *G06Q 20/105* (2013.01); *G06Q 20/32* (2013.01); *G06Q 20/341* (2013.01); *G07F 7/0886* (2013.01); *G07F 7/1008* (2013.01)

(58) Field of Classification Search
CPC ........... G06K 5/00; G06K 19/00; G06F 17/00
(Continued)

(56) References Cited

U.S. PATENT DOCUMENTS 5,559,889 A   9/1996 Easter et al.
6,874,083 B2  3/2005 Sarangi et al.
(Continued)

FOREIGN PATENT DOCUMENTS

AU   2014256377 A1   5/2015
AU   2017201800 A1   4/2017
(Continued)

OTHER PUBLICATIONS

National Institute of Standards and Technology, "Federal Information Processing Standard (FIPS) 140-1: Security Requirements for Cryptographic Modules," Jan. 11, 1994, pp. 1-55.
(Continued)

*Primary Examiner* — Edwyn Labaze
(74) *Attorney, Agent, or Firm* — Maynard Cooper & Gale, P.C.; Brian T. Sattizahn, Esq.

(57) ABSTRACT

A payment terminal can have an integrated memory scanning system that has direct access to the memory of the payment terminal. By having direct access to the memory of the payment terminal, the memory scanning system can access information about the operating system and the applications of the payment terminal to determine if the operating system or applications are performing unauthorized or forbidden actions, which may indicate that a fraudulent transaction or tamper attempt is occurring at the payment terminal. The memory scanning system can determine if an unauthorized action is occurring by comparing the information regarding the operating system or applications obtained from the memory to test criteria stored by the memory scanning system. In addition, the memory scanning system can also have a direct communications with a payment server using information from a network stack in memory that can be accessed directly by the memory scanning system.

30 Claims, 5 Drawing Sheets

(51) Int. Cl.
*G06Q 20/10* (2012.01)
*G06Q 20/32* (2012.01)
*G06Q 20/34* (2012.01)

(58) Field of Classification Search
USPC .................................... 235/380, 375, 487
See application file for complete search history.

(56) References Cited

U.S. PATENT DOCUMENTS

| | | |
|---|---|---|
| 6,895,517 B2 | 5/2005 | Wang |
| 7,581,128 B2 | 8/2009 | Yamada et al. |
| 7,837,110 B1 | 11/2010 | Hess et al. |
| 7,861,097 B2 | 12/2010 | Smeets et al. |
| 8,613,387 B1 | 12/2013 | Billett et al. |
| 8,990,121 B1 | 3/2015 | Guise et al. |
| 9,135,472 B2 | 9/2015 | Smith et al. |
| 9,390,412 B2 | 7/2016 | Weber et al. |
| 9,426,127 B2 | 8/2016 | Huxham et al. |
| 9,542,678 B1 | 1/2017 | Glashan et al. |
| 9,665,870 B1 | 5/2017 | Rezayee et al. |
| 9,818,004 B1 | 11/2017 | Rezayee et al. |
| 9,870,558 B1 | 1/2018 | Rezayee et al. |
| 9,886,596 B1 | 2/2018 | Smith et al. |
| 10,055,234 B1 | 8/2018 | Rao |
| 10,068,223 B1 | 9/2018 | Rezayee et al. |
| 10,235,667 B2 | 3/2019 | Rezayee et al. |
| 2002/0002429 A1 | 1/2002 | Sugimura et al. |
| 2004/0158784 A1 | 8/2004 | Abuhamdeh et al. |
| 2004/0255199 A1 | 12/2004 | Yamashita |
| 2005/0022042 A1 | 1/2005 | Tam et al. |
| 2005/0223211 A1 | 10/2005 | Sukegawa et al. |
| 2007/0001720 A1 | 1/2007 | Li et al. |
| 2007/0226806 A1 | 9/2007 | Tung et al. |
| 2008/0130893 A1 | 6/2008 | Ibrahim et al. |
| 2008/0183912 A1 | 7/2008 | Monroe et al. |
| 2008/0271001 A1 | 10/2008 | Nonomura et al. |
| 2009/0109718 A1 | 4/2009 | Wu et al. |
| 2009/0138748 A1 | 5/2009 | Kim et al. |
| 2009/0282261 A1 | 11/2009 | Khan et al. |
| 2009/0327569 A1 | 12/2009 | Titone et al. |
| 2009/0327795 A1 | 12/2009 | Priel et al. |
| 2010/0070749 A1 | 3/2010 | Tsai |
| 2010/0070791 A1 | 3/2010 | Priel et al. |
| 2010/0077232 A1 | 3/2010 | Jahagirdhar et al. |
| 2010/0125554 A1 | 5/2010 | Jennings et al. |
| 2010/0211507 A1 | 8/2010 | Aabye et al. |
| 2010/0235618 A1 | 9/2010 | Erforth et al. |
| 2011/0222322 A1 | 9/2011 | Kris et al. |
| 2011/0271070 A1* | 11/2011 | Worthington ....... G06F 12/1009 711/165 |
| 2011/0289294 A1 | 11/2011 | Maeda et al. |
| 2013/0070514 A1 | 3/2013 | Weiss et al. |
| 2013/0086375 A1 | 4/2013 | Lyne et al. |
| 2014/0019741 A1 | 1/2014 | Nautiyal et al. |
| 2014/0074637 A1 | 3/2014 | Hammad |
| 2014/0077781 A1 | 3/2014 | Murakami et al. |
| 2014/0108786 A1 | 4/2014 | Kreft |
| 2014/0114495 A1 | 4/2014 | Larrson et al. |
| 2015/0046335 A1 | 2/2015 | Huxham et al. |
| 2015/0052064 A1 | 2/2015 | Karpenko et al. |
| 2015/0208356 A1 | 7/2015 | Niu et al. |
| 2015/0227932 A1 | 8/2015 | Huxham et al. |
| 2015/0356299 A1 | 12/2015 | Barkelew et al. |
| 2016/0104154 A1 | 4/2016 | Milov et al. |
| 2016/0179163 A1 | 6/2016 | Haider et al. |
| 2016/0370837 A1 | 12/2016 | Shi et al. |
| 2017/0068960 A1 | 3/2017 | Kwak et al. |
| 2017/0091762 A1 | 3/2017 | Rezayee et al. |
| 2017/0184642 A1 | 6/2017 | Menard et al. |
| 2017/0236125 A1 | 8/2017 | Guise et al. |
| 2017/0371679 A1 | 12/2017 | Chandrasekhar et al. |
| 2018/0247084 A1 | 8/2018 | Smith et al. |

FOREIGN PATENT DOCUMENTS

| | | |
|---|---|---|
| CA | 2 868 644 A1 | 4/2015 |
| MX | 2014013295 A | 11/2015 |
| WO | 2008/156328 A2 | 12/2008 |

OTHER PUBLICATIONS

National Institute of Standards and Technology, "Federal Information Processing Standards Publication 140-2: Security Requirements for Cryptographic Modules," May 25, 2001, pp. 1-69.
National Institute of Standards and Technology, "Annex A: Approved Security Functions for FIPS PUB 140-2, Security Requirements for Cryptographic Modules," May 30, 2012, pp. 1-9.
National Institute of Standards and Technology, "Annex B: Approved Protection Profiles for FIPS PUB 140-2, Security Requirements for Cryptographic Modules," Aug. 12, 2011, pp. 1-6.
Non-Final Office Action dated Feb. 4, 2015, for U.S. Appl. No. 14/068,484, of Smith, M.R., et al., filed Oct. 31, 2013.
Notice of Allowance dated Jun. 4, 2015, for U.S. Appl. No. 14/068,484, of Smith, M.R., et al., filed Oct. 31, 2013.
First Examination Report for New Zealand Patent Application No. 701459, dated Nov. 20, 2015.
Further Examination Report for New Zealand Patent Application No. 701459, dated Apr. 29, 2016.
Further Examination Report for New Zealand Patent Application No. 701459, dated Jul. 13, 2016.
English-language translation of Office Action for Mexican Patent Application No. 2014013295, dated Aug. 4, 2016.
Notice of Acceptance for New Zealand Patent Application No. 701459, dated Nov. 21, 2016.
Notice of Acceptance for Australian Patent Application No. 2014256377, dated Dec. 12, 2016.
Non-Final Office Action dated Jun. 21, 2017, for U.S. Appl. No. 14/749,992, of Smith, M.R., et al., filed Jun. 25, 2015.
Examiner Requisition for Canadian Patent Application No. 2,868,644, dated Jun. 28, 2017.
Notice of Allowance dated Jul. 17, 2017, for U.S. Appl. No. 15/253,813, of Rezayee, A., et al., filed Aug. 31, 2016.
Notice of Allowance dated Aug. 25, 2017, for U.S. Appl. No. 15/631,785, of Rezayee, A., et al., filed Jun. 23, 2017.
Notice of Allowance dated Sep. 14, 2017, for U.S. Appl. No. 15/631,785, of Rezayee, A., et al., filed Jun. 23, 2017.
Notice of Allowance dated Sep. 22, 2017, for U.S. Appl. No. 14/749,992, of Smith, M.R., et al., filed Jun. 25, 2015.
Non-Final Office Action dated Feb. 8, 2018, for U.S. Appl. No. 15/846,196, of Rezayee, A., et al., filed Dec. 18, 2017.
First Examination Report for Australian Patent Application No. 2017201800, dated Mar. 21, 2018.
Notice of Allowance dated May 2, 2018, for U.S. Appl. No. 15/846,196, of Rezayee, A., et al., filed Dec. 18, 2017.
Notice of Acceptance for Australian Patent Application No. 2017201800, dated Jul. 4, 2018.
International Search Report and Written Opinion for International Application No. PCT/US2018/039060, dated Sep. 3, 2018.
Non-Final Office Action dated Sep. 10, 2018, for U.S. Appl. No. 15/859,036, of Smith, M.R., et al., filed Dec. 29, 2017.
Examiner Requisition for Canadian Patent Application No. 2,868,644, dated Sep. 13, 2018.
Notice of Allowance dated Oct. 29, 2018, for U.S. Appl. No. 16/120,398, of Rezayee, A., et al., filed Sep. 3, 2018.
Notice of Allowance dated Mar. 22, 2019, for U.S. Appl. No. 15/396,611, of Ng., K.K.W., et al., filed Dec. 31, 2016.
International Search Report and Written Opinion for International Application No. PCT/US2018/053494, dated Jan. 29, 2019.
Notice of Allowance dated Dec. 3, 2018, for U.S. Appl. No. 16/120,398, of Rezayee, A., et al., filed Sep. 3, 2018.
Non-Final Office Action dated Jan. 7, 2019, for U.S. Appl. No. 15/859,036, of Smith, M.R., et al., filed Dec. 29, 2017.

* cited by examiner

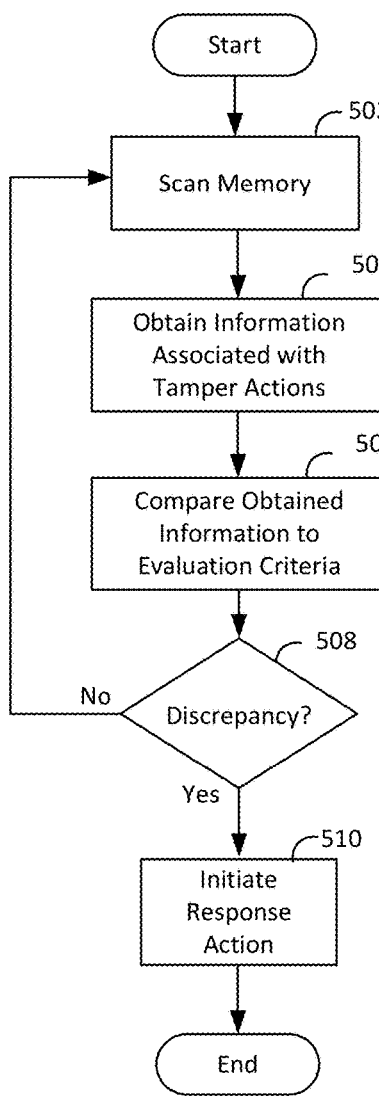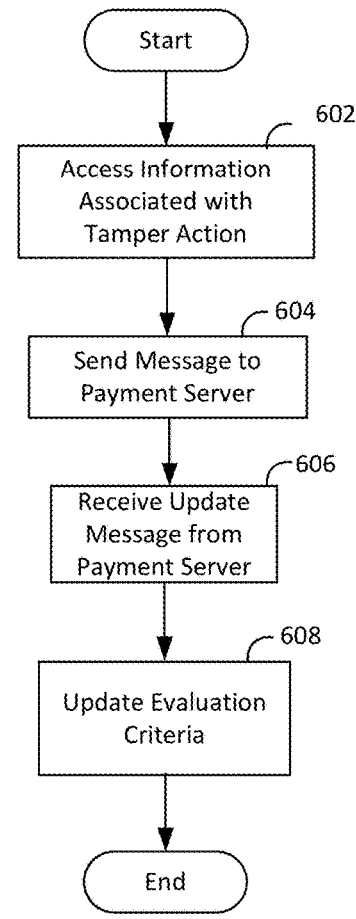
FIG. 5
FIG. 6

SCANNING SYSTEM WITH DIRECT ACCESS TO MEMORY

BACKGROUND

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is inserted into corresponding EMV slot of the payment terminal, and near field communication (NFC) enabled devices such as a smart phone or EMV card that is tapped at the payment terminal and transmits payment information over a secure wireless connection. The payment terminal may receive payment information from the payment device as well as information about a transaction, and may communicate this information to a payment system for processing of the transaction.

As a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

The payment terminal may attempt to identify fraudulent transactions and tamper attempts using software based techniques. However, the use of software to identify fraudulent transactions and tamper attempts may be limited because the software only has access to certain information regarding the operation of the payment terminal. For example, the operating system for the payment terminal may limit the ability of software programs (e.g., the fraud and tamper identification software) to access certain portions of memory, which access restrictions can affect the ability of the software to determine when the payment terminal may have been compromised by unauthorized activity.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 5 depicts a non-limiting flow diagram illustrating exemplary steps for scanning and analyzing the memory of a payment terminal in accordance with some embodiments of the present disclosure; and FIG. 6 depicts a non-limiting flow diagram illustrating exemplary steps for updating detection criteria for an analysis module in accordance with some embodiments of the present disclosure.

DETAILED DESCRIPTION

Figure 1:
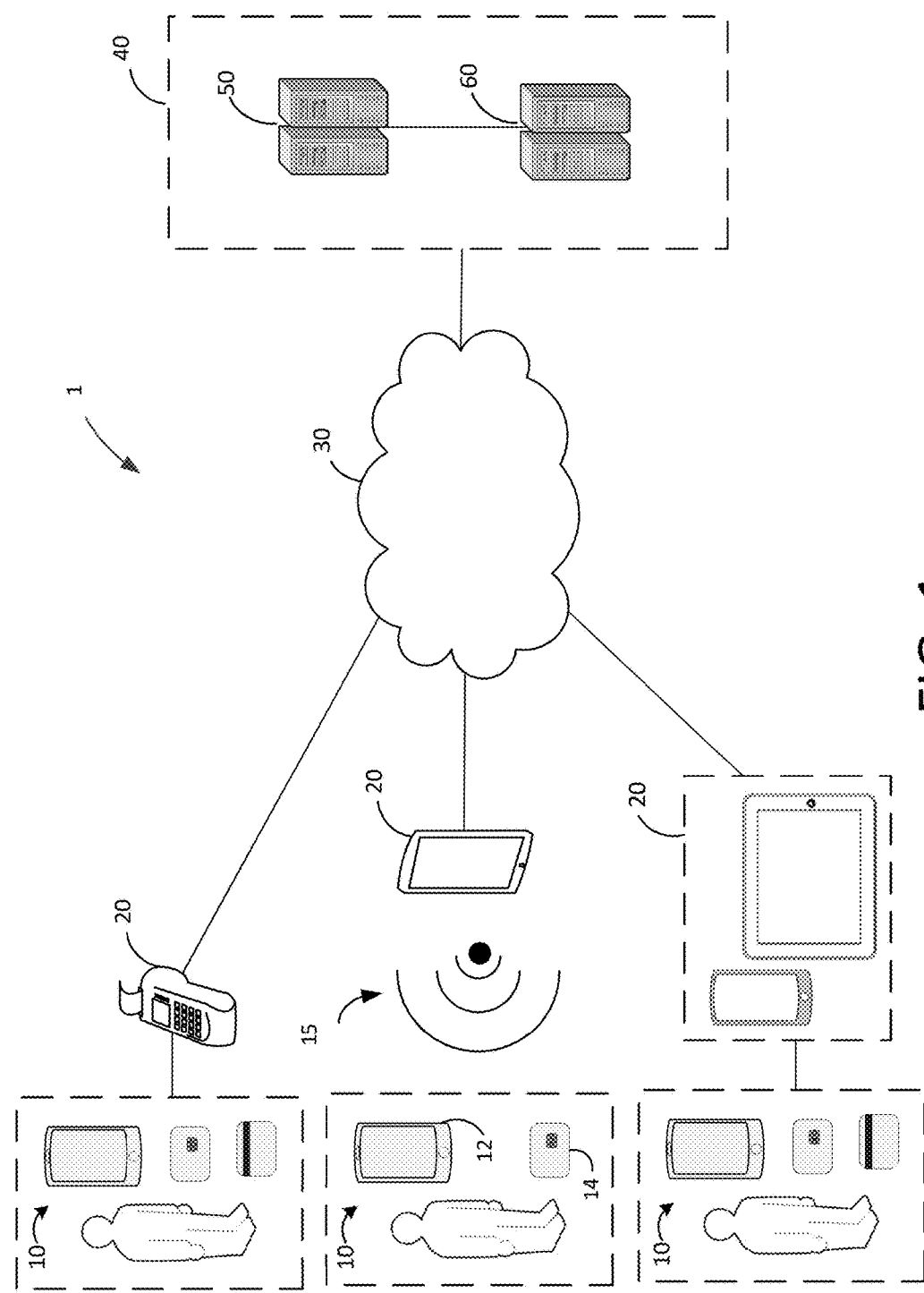
FIG. 1 shows an illustrative block diagram of a payment system in accordance with some embodiments of the present disclosure.

A payment terminal can be used to process payment information (e.g., acquire payment information from a payment interface, encrypt the acquired payment information, and perform payment processing according to payment processing protocols for exchange of information with a payment server). The payment terminal can have an application processing unit and a general memory. The general memory stores an operating system and one or more applications and/or processes, each of which has corresponding instructions that can be executed by the application processing unit. In addition, the memory can also store a network stack for communications outside of the payment terminal and general information and/or data relating to the operation of the payment terminal.

The payment terminal can also incorporate a memory scanning system that has direct memory access to the general memory of the payment terminal. The memory scanning system is able to access any portion of the general memory, including the operating system, the applications and/or process, and the general information and/or data, using the direct memory access capability without having to interface with an intermediary device such as the application processing unit. The memory scanning system can then use the information obtained from the general memory to determine whether the payment terminal is secure. After determining if the payment terminal is secure, the memory scanning system can communicate with a payment server (e.g., based on direct or indirect access to the network stack).

The memory scanning system can send a message to the payment server that provides information to the payment server as to whether the payment terminal is secure and underlying status information used for that determination. In some instances, the payment server may make its own determination as to whether the payment terminal is secure, for example, based on additional information that is available to the payment server. If the payment terminal is not secure, the payment server may not process payment transactions from the payment terminal until the payment terminal is determined to be secure. The payment server may also provide instructions for remedial actions to be performed at the payment terminal. In addition, in response to a determination that the payment terminal is not secure (e.g., by thy payment terminal or the payment server), the memory scanning system of the payment terminal may take remedial or corrective actions to prevent the unauthorized transfer of payment information and/or to stop the activity that is making the payment terminal unsecure.

The memory scanning system can determine if the payment terminal is secure by comparing information accessed from the general memory with corresponding test criteria stored by the memory scanning system. If there is a discrepancy between the test criteria and the obtained information from the general memory, the memory scanning system can make a determination that the payment terminal is performing forbidden or unauthorized actions, which can be indicative or a tamper attempt or fraudulent transaction at the payment terminal, and that the payment terminal is not secure. The test criteria stored by the memory scanning system can be updated by the payment server to enable the memory scanning system to better determine when the payment terminal is secure and when the payment terminal is not secure. In some embodiments, an initial determination of a possible non-secure condition may be made by the memory scanning system and information may be transmitted to the payment server for further analysis.

The memory scanning system may be implemented as a separate, stand-alone chip that has a direct connection to the general memory and a connection to the application processing unit. In embodiments, the memory scanning system may perform both read and write operations for the general memory and the application processing unit, while in other embodiments the memory scanning system may only perform read operations with one or both of the general memory and the application processing unit. Alternatively, the memory scanning system may be incorporated within the application processing unit. The memory scanning system can still maintain the direct access to the general memory even though the memory scanning system is incorporated in the application processing unit. In one embodiment, the memory scanning system can include a secure processing unit and secure memory that is integrated into the application processing unit. In another embodiment, the memory scanning system can be implemented as an application that is executed within a secure enclave or secure portion of the application processing unit. Regardless of the configuration, the memory scanning system can be physically and logically separated from the other components of the payment terminal.

In some embodiments, the memory scanning system may perform physical and logical scans or tests on the general memory to collect information that is useful in determining whether or not a transaction is fraudulent, or whether an attacker is attempting to tamper with the payment terminal, or whether an attacker has attempted (successfully or not) to tamper with the payment terminal. The memory scanning system may take corrective action (e.g., aborting a transaction or disabling one or more components of the payment terminal) based on a comparison of the collected information to one or more test criteria or commands and/or evaluation criteria. In some embodiments, the information may be transmitted to the payment server for subsequent processing by the payment server. In some embodiments, the information may be transmitted to the payment server for all processing by the payment server, such that no processing is performed at the payment terminal. The payment server may determine whether to take corrective action based on the received information as well as information from previous transactions and other ongoing transactions. The payment server may provide a fraud or tamper determination message to the memory scanning system, which may cause the memory scanning system to take corrective action. In some embodiments, the payment server may also generate updated test criteria for the memory scanning system and provide the update to the memory scanning system for use in processing of future transactions.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. The components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic strip, a credit card having an EMV chip, or a NFC-enabled electronic device such as a smart phone running a payment application. The merchant has a payment terminal 20, such as payment-integrated mobile device (e.g., a smart phone or tablet computer), executing a payment application and including at least one interface for receiving payment information from the payment device 10. The payment terminal 20 can be capable of receiving and processing payment information (e.g., encrypted payment card data and user authentication data) and transaction information (e.g., purchase amount and point-of-purchase information).

In some embodiments (e.g., for low-value transactions or for payment transactions that are less than a payment limit indicated by a NFC or EMV payment device 10), the initial processing and approval of the payment transaction may be processed at payment terminal 20. In other embodiments, payment terminal 20 may communicate with payment server 40 over communication network 30. Although communication network 30 may be any suitable communication network, in one embodiment communication network 30 may be the Internet and payment and transaction information may be communicated between payment terminal 20 and payment server 40 in an encrypted format such by a transport layer security (TLS) or secure socket layer (SSL) protocol. In addition, the payment terminal 20 may use the transmission control protocol/Internet protocol (TCP/IP) for communication when the network 30 is the Internet.

Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and respond to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal 20, for example, at a screen of a payment terminal 20. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In one embodiment, payment device 10 may be a device that is capable of communicating with payment terminal 20, such as a NFC device 12 or an EMV chip card 14. Chip card 14 may include a secure integrated circuit that is capable of communicating with a payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with a corresponding interface of payment terminal 20 (e.g., in accordance with ISO 7816) and in some embodiments, may be inductively coupled to payment terminal 20 via a near field 15. A chip card 14 that is inductively coupled to payment terminal 20 may communicate with payment terminal 20 using load modulation of a wireless carrier signal that is provided by payment terminal 20 in accordance with a wireless communication standard such as ISO 14443.

NFC device 12 may be an electronic device such as a smart phone, tablet computer, or smart watch that is capable of engaging in secure transactions with payment terminal 20. NFC device 12 may have hardware (e.g., a secure element including hardware and executable code) and/or software (e.g., executable code operating on a processor in accordance with a host card emulation routine) for performing secure transaction functions. During a payment transaction, NFC device 12 may be inductively coupled to payment terminal 20 via near field 15 and may communicate with payment terminal 20 by active or passive load modulation of a wireless carrier signal provided by payment terminal 20 in accordance with one or more wireless communication standards such as ISO 14443 and ISO 18092.

The payment terminal 20 can have a point-of-sale or payment application that may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information.

In some embodiments, the payment terminal 20 executes a point-of-sale application that provides a user interface for the merchant and facilitates communication between payment device 10 and the payment server 40. As described herein, a payment device 10 such as NFC device 12 or chip card 14 may communicate with payment terminal 20 via inductive coupling. This is depicted in FIG. 1 as near field 15, which includes a wireless carrier signal having a suitable frequency (e.g., 13.56 MHz) emitted from payment terminal 20.

Figure 2:
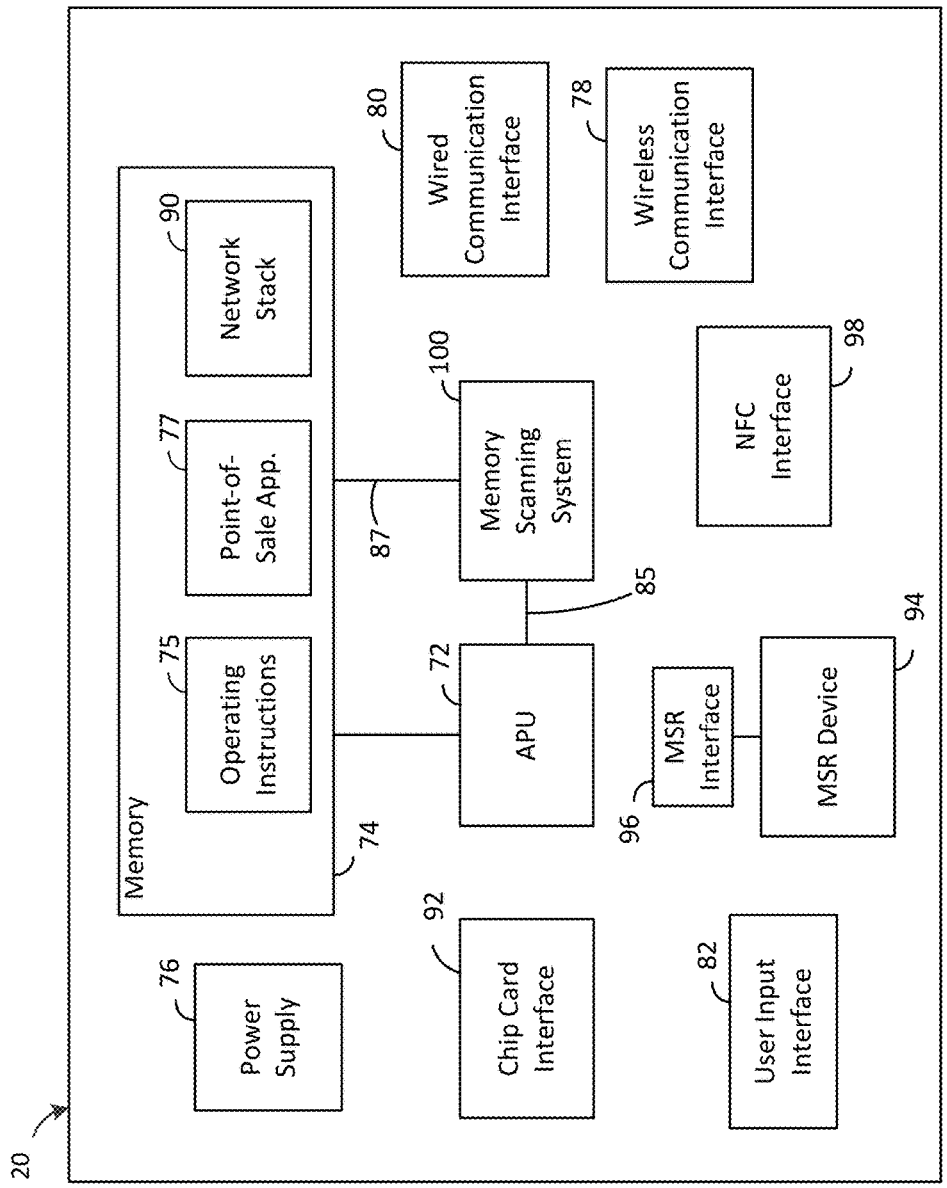
FIG. 2 depicts an illustrative block diagrams of a payment terminal in accordance with some embodiments of the present disclosure.
Figure 3:
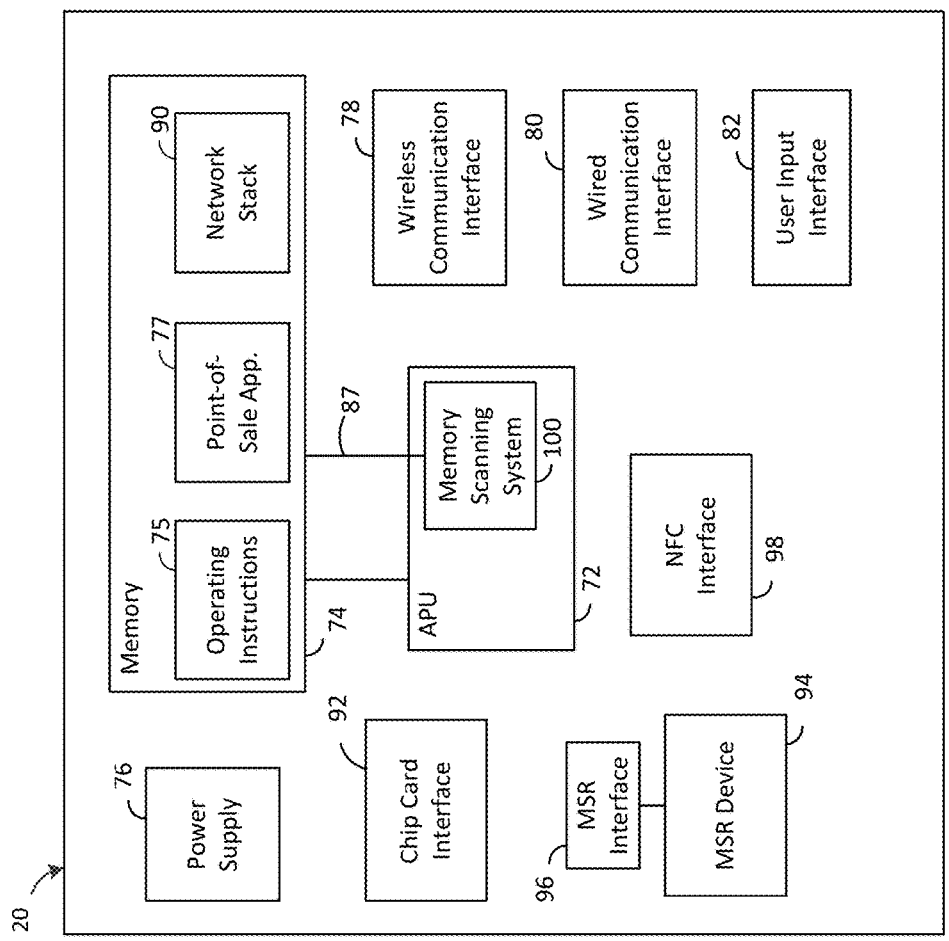
FIG. 3 depicts an illustrative block diagrams of a payment terminal in accordance with some embodiments of the present disclosure.

FIGS. 2 and 3 depict illustrative block diagrams of payment terminal 20 in accordance with some embodiments of the present disclosure. Although particular components are depicted in particular arrangements in FIGS. 2 and 3, it will be understood that payment terminal 20 may include additional components, one or more of the components depicted in FIGS. 2 and 3 may not be included in the payment terminal 20, and the components of the payment terminal 20 may be rearranged in a variety of suitable manners.

In the embodiment of the payment terminal 20 shown in FIG. 2, the payment terminal 20 can include an application processing unit (APU) 72, a general memory 74, a power supply 76, a wireless communication interface 78, a wired communication interface 80, a plurality of payment interfaces (e.g., a chip card interface 92, a magnetic strip reader (MSR) device 94 and corresponding MSR interface 96, and a NFC interface 98) and a user input interface 82. In one embodiment, the application processing unit 72 and general memory 74 can be configured in a particular manner and incorporated into payment terminal 20 as separate components. However, it will be understood that application processing unit 72 and general memory 74 may be configured in any suitable manner to provide the desired functionality for the payment terminal 20. It will also be understood that the functionality of the application processing unit 72 may be embodied in a single chip or a plurality of chips, each including any suitable combination of processing units and memory to collectively perform the functionality of application processing unit 72.

In some embodiments, application processing unit 72 of payment terminal 20 may be a suitable processor and may include hardware, software, memory, and circuitry as is necessary to perform and control the functions of payment terminal 20. Application processing unit 72 may include one or more processors, and may perform many of the operations of the payment terminal 20 based on instructions in any suitable number of memories and memory types. In some embodiments, application processing unit 72 may have multiple independent processing units, for example a multi-core processor or other similar component. Application processing unit 72 may execute instructions stored in memory 74 to control the operations of payment terminal 20. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof. A processor may execute software to perform the operations described herein, including software accessed in machine readable form on a tangible non-transitory computer readable storage medium.

As used herein, memory may refer to any suitable tangible or non-transitory storage medium. Examples of tangible (or non-transitory) storage medium include disks, thumb drives, memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Memory 74 may include a plurality of sets of instructions for performing the processing operations of payment terminal 20, such as operating instructions 75, point-of-sale application instructions 77, network stack 90 and any other suitable instructions for operating the payment terminal 20 (e.g., instructions related to the operation of one or more other applications or components of the payment terminal 20).

Operating instructions 75 may include instructions for controlling any suitable general operations of the payment terminal 20, such as internal communications, power management, execution and coordination of applications, control of I/O devices, control of communication devices, control of other hardware of the payment terminal 20, any other suitable instructions, or any combination thereof. In one embodiment, the operating instructions may provide instructions for the operating system of the payment terminal 20 as well as most drivers, programs, and applications operating on the payment terminal 20.

Operating instructions 75 may include instructions for controlling the operations of interface components such as a user input interface 82, sensors, or other components that allow the electronic device to interact with external users or the environment. The interfaces may be controlled in accordance with the instructions of programs and applications such as integrated or third party applications running on the electronic device (not depicted). An example of such applications may be a point-of-sale application, which may operate according to the point-of-sale application instructions 77.

Operating instructions 75 and/or point-of-sale application instructions 77 may also include instructions for interacting with the plurality of payment interfaces and for interacting with a payment service system 50 at a payment server 40. The point-of-sale application executing on the payment terminal 20 may be known (e.g., via a registration process) to the payment service system 50, such that the payment terminal 20 may process payments with the payment service system 50 according to the point-of-sale application instructions 77. In one embodiment, the operating instructions 75 and/or point-of-sale application instructions 77 can include instructions or messages to perform functions such as requesting cryptographic operations to be performed, performing payment operations, providing or receiving software updates, and other similar operations.

Point-of-sale application instructions 77 include instructions for running a point-of-sale application on the payment terminal 20. When executed by the application processing unit 72, the point-of-sale application instructions 77 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. Further, at an appropriate time within the transaction process, the point-of-sale application may send a message to one or more payment interfaces to permit the payment terminal 20 to receive payment information from a payment device 10. In some embodiments, the point-of-sale application instructions 77 may include instructions for providing a rich display of information relating to fraudulent transactions and tamper attempts, and options for selection of corrective action to take in response to fraudulent transactions and tamper attempts.

Power supply 76 may include one or more power supplies such as a physical connection to AC power, DC power, or a battery. Power supply 76 may include power conversion circuitry for converting an AC or DC power source into a plurality of DC voltages for use by components of payment terminal 20. When the power supply 76 includes a battery, the battery may be charged via a physical power connection, via inductive charging, or via any other suitable method. Although not depicted as physically connected to the other components of the payment terminals in FIGS. 2 and 3, power supply 76 may supply a variety of voltages to the components of the payment terminal 20 in accordance with the requirements of those components.

Wireless communication interface 78 may include suitable wireless communications hardware (e.g., antennas, matching circuitry, etc.) and one or more processors having processing capability necessary to engage in wireless communication and control associated circuitry, including but not limited to hardware logic, computer readable instructions running on a processor, or any suitable combination thereof. Although wireless communication interface 78 may be implemented in any suitable manner, in an exemplary embodiment, wireless communication interface 78 may be implemented as a device which may include a cellular transceiver (not depicted), a processing unit (not depicted), and a memory (not depicted). In some embodiments, wireless communication interface 78 may allow payment terminal 20 to communicate with payment server 40 via network 30.

Wired communication interface 80 may include any suitable interface for wired communication with other devices or a communication network, such as USB, Lightning, FireWire, Ethernet, any other suitable wired communication interface, or a suitable combination thereof. In some embodiments, wired communication interface 80 may allow payment terminal 20 to communicate with payment server 40 either directly or via network 30.

In one embodiment, the user input interface 82 may provide various options for the user of the payment terminal 20 to interact with applications and programs running on the payment terminal 20. An exemplary user input interface 82 may include hardware and software for any suitable user interface, such as a touchscreen interface, camera, voice command interface, keyboard, mouse, gesture recognition interface, any other suitable user interface, or any combination thereof. The user input interface 82 can receive different types of user inputs such as touch inputs, voice inputs, fingerprints, iris scan, facial data, photographs, videos, text entry or other suitable types of inputs. The user input interface 82 may also include sensors that may allow the payment terminal 20 to determine additional information about the user or the user's environment, such as accelerometers, gyroscopes, pressure sensors, magnetometers, time-of-flight sensors, infrared sensors, biometric sensors (e.g., fingerprint, iris, facial, etc.), airborne particulate sensors, and other related sensor types. In one embodiment, the user input interface 82 may be a touchscreen interface that displays an interactive user interface for programs and applications, such as a point-of-sale application running on the payment terminal 20, and that can receive a touch input from a user.

The payment terminal 20 can include a plurality of payment interfaces (e.g., a chip card interface 92, a magnetic strip reader (MSR) device 94 and corresponding MSR interface 96, and an NFC interface 98) that are connected to corresponding ports or terminals on the application processing unit 72. In one embodiment, the chip card interface 92 can include an EMV interface that is capable of receiving chip card 14. Chip card 14 may have contacts that engage and physically interface with corresponding contacts or contact pins of chip card interface 92 when chip card 14 is inserted into the chip card interface 92. Chip card interface 92 provides power and communications to an EMV chip of chip card 14 according to EMV specifications. The chip card interface 92 can be coupled to the application processing unit 72 by connections that can include power lines, data lines and ground lines.

The NFC interface 98 may provide for NFC communication with a contactless payment device such as NFC device 12 or chip card 14. In one embodiment, the NFC interface 98 can include appropriate circuitry for NFC communications such as electromagnetic compatibility (EMC) circuitry, matching circuitry, modulation circuitry, and measurement circuitry. Based on a signal provided by the application processing unit 72, the NFC interface 98 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment terminal 20 is inductively coupled to a contactless payment device 10, the contactless payment device 10 may also modulate the carrier signal via active or passive load modulation. By changing the tuning characteristics of the antenna of payment device 10 (e.g., by selectively switching a parallel load into the antenna circuit based on modulated data to be transmitted), the wireless carrier signal is modified at both the payment device 10 and payment terminal 20, resulting in a modulated wireless carrier signal. In this manner, the payment device 10 is capable of sending modulated data to payment terminal 20, which may be sensed by the NFC interface 98 and provided to the application processing unit 72 for processing. Based on the modulations of the carrier signal within near field 15, payment terminal 20 and a contactless payment device 10 are able to communicate information such as payment information.

In one embodiment, in order to communicate information to payment device 10, application processing unit 72 changes the amplitude and/or phase of the wireless carrier signal based on data to be transmitted from application processing unit 72, resulting in a wireless data signal that is transmitted to the payment device 10. This signal is transmitted by the NFC interface 98 that is tuned to transmit at 13.56 MHz, and if the payment device 10 also has a suitably tuned antenna within the range of the near field 15 (e.g., 0 to 10 cm), the payment device 10 receives the wireless carrier signal or wireless data signal that is transmitted by NFC interface 98. In the case of a wireless data signal, processing circuitry of the payment device 10 is able to demodulate the received signal and process the data that is received from application processing unit 72.

The payment terminal 20 may also include a MSR device 94 and a corresponding MSR interface 96 for interfacing with a magnetic strip card. In some embodiments, the MSR device 94 may include a slot that guides a customer to swipe or dip the magnetized strip of the magnetic strip card such that the MSR device 94 and the MSR interface 96 can receive payment information from the magnetic strip card. The received payment information can then be provided to the application processing unit 72 for processing by the payment subsystem instructions 90. In one embodiment, the MSR device 94 and the MSR interface 96 can be combined into a single device that can provide the functionality of the MSR device 94 and the MSR interface 96.

The memory 74 of payment terminal 20 can also include network (or protocol) stack 90 to facilitate external communications (e.g., to and from the payment terminal 20) using a communication such as wired communication interface 80, wireless communication interface 78, or NFC interface 98. In one embodiment, the network stack 90 can include a set of layered protocols that are used to provide functionality in a communication network. The multiple protocol layers of the network stack 90 can have a hierarchy that enables data from an application to be formatted appropriately for transmission on network 30 by any of the communication interfaces. Similarly, the network stack 90 can be used to convert data from the network 30 into a format suitable for an application of the payment terminal 20.

In some embodiments of the present disclosure, the payment terminal 20 can include a memory scanning system 100 that is physically and/or logically isolated from the application processing unit 72 and the other components of the payment terminal 20. The memory scanning system 100 can be used to scan memory 74 and identify any discrepancies in the information (e.g., applications, processes, data, etc.) stored in memory 74. If a discrepancy in the stored information is identified (e.g., a stored value does not match an expected value), the memory scanning system 100 can determine that the payment terminal 20 is not operating appropriately as a result of an attempt to tamper with the payment terminal or an attempt to process a fraudulent transaction. If the memory scanning system 100 determines that the payment terminal 20 is not operating appropriately, the memory scanning system 100 can perform a responsive action (e.g., sending a message to the payment server 40 or taking corrective action). In other embodiments, the determinations made by the memory scanning system 100 can be used as part of a remote attestation process between the payment terminal 20 and the payment service system 50.

The memory scanning system 100 can be connected to access the memory without needing to access communicate with the application processor or any programs running thereon, for example, by being directly connected to memory 74 by connection 87. The direct connection between memory scanning system 100 and memory 74 permits the memory scanning system 100 to have direct access to any information stored in memory 74 without having to use an intermediate component (e.g., application processing unit 72) to access the memory 74. Since the memory scanning system 100 has direct memory access to memory 74, the memory scanning system 100 has unrestricted and/or unlimited access to the information in memory 74 down to the level of each individual location in the memory 74. In one embodiment, the memory scanning system 100 can access the memory 74 using asynchronous DMA (direct memory access). However, other techniques for accessing memory 74 can be used in other embodiments.

The memory scanning system 100 can also be connected to the application processing unit 72 by a connection 85. The connection 85 can be configured to use communication interfaces such as serial communication interfaces or buses (e.g., I²C, SPI, UART, USB, and GPIO) to transfer information, data, signals, etc. between the application processing unit 72 and the memory scanning system 100. In addition, one or more software drivers can be provided to one or both of the application processing unit 72 and the memory scanning system 100 to enable the application processing unit 72 and the memory scanning system 100 to communicate with each other via connection 85. In one embodiment, the memory scanning system 100 and the application processing unit 72 may exchange information if the memory scanning system 100 is providing information for a remote attestation process that is part of a point-of-sale application being executed by the application processing unit 72.

In the embodiment of the payment terminal 20 shown in FIG. 3, the payment terminal 20 can include the general memory 74, the power supply 76, the wireless communication interface 78, the wired communication interface 80, the plurality of payment interfaces (e.g., a chip card interface 92, a magnetic strip reader (MSR) device 94 and corresponding MSR interface 96, and an NFC interface 98) and the user input interface 82 as described above with respect to FIG. 2. The application processing unit 72 can incorporate the memory scanning system 100 that is directly connected to memory 74 by connection 87. The direct connection between memory scanning system 100 and memory 74 permits the memory scanning system 100 to have direct access to any information stored in memory 74. In one embodiment, the memory scanning system 100 can be physically and/or logically isolated within the application processing unit 72.

The memory scanning system 100 of the application processing unit 72 can be used to scan memory 74 and identify any discrepancies in the information (e.g., applications, processes, data, etc.) stored in memory 74. If a discrepancy in the stored information is identified (e.g., a stored value does not match an expected value), the memory scanning system 100 can determine that the payment terminal 20 is not operating appropriately as a result of an attempt to tamper with the payment terminal or an attempt to process a fraudulent transaction. If the memory scanning system 100 determines that the payment terminal 20 is not operating appropriately, the memory scanning system 100 can perform a responsive action (e.g., sending a message to the payment server 40). In other embodiments, the determinations made by the memory scanning system 100 can be used as part of a remote attestation process between the payment terminal 20 and the payment service system 50.

In the embodiment of FIG. 3, the memory scanning system 100 is incorporated within the application processing unit 72 instead of being a separate component as shown in FIG. 2. Similar to the embodiment of the memory scanning system 100 described below with respect to FIG. 4, the memory scanning system 100 incorporated in application processing unit 72 can include a secure processing unit and secure memory storing instructions executed by the secure processing unit to perform the memory scanning and analysis operations in one embodiment.

In another embodiment, the memory scanning system 100 can be an application executed within a secure area or secure enclave of the application processing unit 72. The secure area of the application processing unit 72 can be physically and logically isolated from other components of the application processing unit. The secure area can include corresponding hardware (e.g., processing units, memory), firmware and software (e.g., applications) such that a secure processing environment is provided in the application processing unit 72. In one embodiment, the secure area of the application processing unit 72 can be implemented with TrustZone® technology from ARM Ltd. However, other technologies can be used to implement the secure area of the application processing unit 72 in other embodiments.

Figure 4:
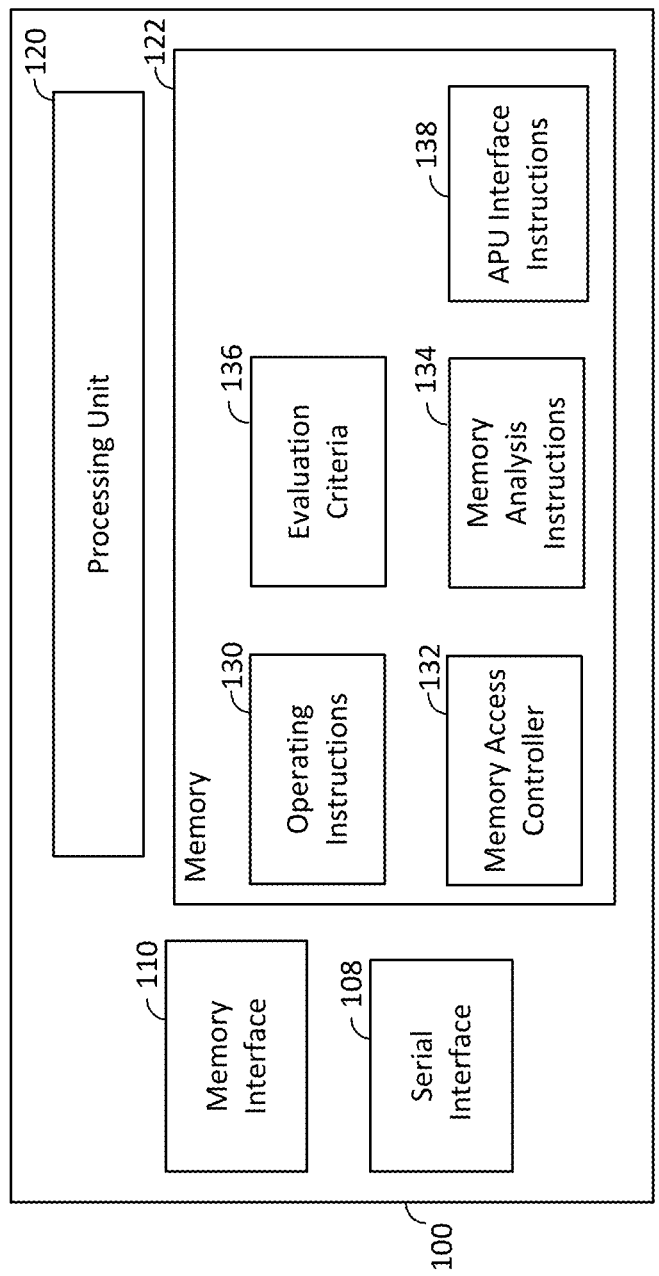
FIG. 4 depicts an illustrative block diagram of an analysis module in accordance with some embodiments of the present disclosure.

FIG. 4 depicts a block diagram of a memory scanning system 100 in accordance with some embodiments of the present disclosure. Although particular components are depicted in a particular arrangement in FIG. 4, it will be understood that memory scanning system 100 may include additional components, one or more of the components depicted in FIG. 4 may not be included in memory scanning system 100, and the components of memory scanning system 100 may be rearranged in any suitable manner.

In one embodiment, memory scanning system 100 includes a processing unit 120, memory 122, a serial interface 108, and a memory interface 110. Although in one embodiment the processing unit 120 and memory 122 will be described as packaged in memory scanning system 100 and configured in a particular manner, it will be understood that processing unit 120 and memory 122 may be packaged within the memory scanning system 100 in a variety of other suitable manners consistent with the present disclosure. It will also be understood that the functionality of memory scanning system 100 may be embodied in a single chip or a plurality of chips, each including any suitable combination of processing units and memory to collectively perform the functionality of memory scanning system 100 described herein.

In some embodiments, processing unit 120 of memory scanning system 100 may be a suitable processor and may include hardware, software, memory, and circuitry as is necessary to perform and control the functions of memory scanning system 100. Processing unit 120 may include one or more processors, and may perform the operations of memory scanning system 100 based on instructions in any suitable number of memories and memory types. Processing unit 120 may execute instructions stored in memory 122 of memory scanning system 100 to control the operations and processing of memory scanning system 100.

In an exemplary embodiment, the processing unit 120 of memory scanning system 100 may operate to perform the memory scanning and analysis function of memory scanning system 100, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Memory scanning system 100 may also include additional circuitry (not depicted) such as interface circuitry, analog front-end circuitry, security circuitry, and monitoring component circuitry. In one embodiment, the interface circuitry may include circuitry for interfacing with wireless communication interface 78 (e.g., Wi-Fi, Bluetooth classic, and Bluetooth low energy), circuitry for interfacing with wired communication interface 80 (e.g., USB, Ethernet, FireWire, and Lightning), and circuitry for interfacing with power supply 76 (e.g., power management circuitry, power conversion circuitry, and rectifiers).

Although in different embodiments the memory scanning system 100 may be in communication with the application processing unit 72 using a variety of protocols and interfaces, in an embodiment, the memory scanning system 100 and application processing unit 72 may communicate over serial interface 108. Serial interface 108 may include suitable communications hardware and/or circuitry necessary to engage in communication with the application processing unit 72 using a serial communication protocol (e.g., I2C, SPI, USB, UART, and GPIO). The serial interface 108 may provide for a single connection (i.e., 1 line or wire) between the application processing unit 72 and the memory scanning system 100 or for multiple connections (i.e., more than 1 line or wire) between the application processing unit 72 and the memory scanning system 100. In one embodiment, the serial interface 108 can be a GPIO pin on the memory scanning system 100 that can be configured for communication with the application processing unit 72.

The memory scanning system 100 may be in communication with the memory 74 using a variety of protocols and interfaces. In an embodiment, the memory scanning system 100 and memory 74 may communicate via memory interface 110. Memory interface 110 may include suitable communications hardware and/or circuitry necessary to engage in communication with the memory 74 using a suitable protocol or architecture. The memory interface 110 may provide for a single connection (i.e., 1 line or wire) between the memory 74 and the memory scanning system 100 or for multiple connections (i.e., more than 1 line or wire) between the memory 74 and the memory scanning system 100.

In some embodiments, memory 122 may be a suitable memory as described herein, and may include a plurality of sets of instructions for controlling operations of memory scanning system 100, such as operating instructions 130, memory access controller 132, memory analysis instructions 134, and evaluation criteria 136. In addition, memory 122 may also have APU interface instructions 138 to enable the memory scanning system 100 to communicate with the application processing unit 72.

Operating instructions 130 may include instructions for controlling general operations of the memory scanning system 100, such as internal communications, power management, processing of messages, system monitoring, sleep modes, user interface response and control, operation of the serial interface 108, and the memory interface 110, and the management of the other sets of instructions. In one embodiment, the operating instructions 130 may provide the operating system and applications necessary to perform the general processing operations that are performed by the processing unit 120 of the memory scanning system 100.

The memory access controller 132 enables memory scanning system 100 to access memory 74 independent of application processing unit 72. In other words, the memory scanning system 100 does not have to communicate with the application processing unit 72 in order to be able to access the memory 74. The memory access controller 132 can provide direct memory access to any portion of memory 74 via memory interface 110. For example, the memory access controller 132 can access information in memory 74 about all processes in memory 74, an operating system kernel for the payment terminal 20, individual memory blocks or locations, a network or protocol stack 90, and/or any other information or data or subset of the same that is stored in memory 74.

In one embodiment, the memory access controller 132 can generate memory addresses and initiate memory read or write cycles. The memory access controller 132 can include one or more registers (e.g., a memory address register, a byte count register, or a control register) that can be written and read by the processing unit 120. For example, some information that may be stored in a register can include the area of memory 74 to access or scan, the size of the transfer unit, and/or the number of bytes to transfer in one burst.

The memory analysis instructions 134 can be executed by processing unit 120 to process and/or analyze the information obtained from the memory 74 by memory access controller 132 in order to determine if the payment terminal 20 is secure or trusted. The memory analysis instructions 134 can include varying levels of specificity and granularity for determining if the payment terminal 20 is secure or trusted. Some operations that can be performed by the memory analysis instructions 134 can include, but are not limited to, hashing a portion of software code stored in memory 74, scanning particular registers or locations of memory 74, checking for jail-breaking of the software code stored in memory 74, detecting for alterations of the operating instructions 75 and/or network stack 90, checking checksums or parity bits stored in memory 74, determining a privilege level for applications and processes in memory 74 (e.g., does an application or process have a raised privilege level), determining whether other applications and processes are being accessed by an application or process in memory 74, and/or gathering metadata associated with a mounted file system stored in memory 74. In addition, the memory analysis instructions 134 can evaluate the following information stored in memory 74: electrical characteristics (e.g., current, voltage, impedance, and capacitance) of various components of the payment terminal 20, such as the payment interfaces that interact with the various types of payment devices 10; platform characteristics such as manufacturing or engineering tolerances, timing parameters, and associated behaviors; indicators related to the activation of certain communication ports; measured phase error, frequency error, power and spectrum of the power signal; power signal levels such as RSSI levels, RSSI vs. frequency measurements; engineering tolerances, hardware imperfections inherent to analog components of the device, radio frequency responses to certain signals; and measured physical, mechanical, magnetic, electro-mechanical, or operational characteristics. The information from memory 74 obtained by the memory analysis instructions 134 can then be analyzed in view of pre-set values or test criteria stored in evaluation criteria 136. The pre-set values or test criteria stored in evaluation criteria 136 can be determined by security experts or based on reliably measured data collected over a population of payment terminals 20. The pre-set values or test criteria stored in evaluation criteria 136 can be updated, as necessary, by the payment server 40 in one embodiment.

In some embodiments, the evaluation criteria 136 may be tiered with evaluation criteria stored at another device such as a payment server. The local evaluation criteria 136 of the memory scanning system 100 may perform an initial analysis and provide the results of that analysis to the external device. In some embodiments, the evaluation criteria 136 may include information directing memory scanning system to gather additional information (e.g., additional memory values, status from applications, sensor readings, etc.) for transmission to the payment server along with the notification of the possible anomalous memory result, based on the anomalous memory result.

The memory analysis instructions 134 can be used to identify discrepancies in stored values and/or processes that are engaging in activities that exceed the expected activities of that particular process (e.g., accessing data or information not normally used by the process). For example, the memory analysis instructions 134 can be used for detecting a tamper attempt at the chip card interface 92, the MSR device 94 and/or MSR interface 96, or the NFC interface 98, or through any applications executing on the application processing unit. Although the memory analysis instructions 134 will be described herein as providing functionality for determining tamper attempts at a payment interface, it will be understood that similar instructions may be employed to perform tamper monitoring of other physical interfaces of a suitable device requiring security at various physical interfaces (e.g., sensitive communications technology, banking equipment, customer kiosks, etc.) and/or any suitable software and applications that have access to and utilize the memory.

In an embodiment, the memory analysis instructions 134 can trigger, either directly or via the application processing unit 72, monitoring components to measure electrical characteristics of various components of the payment terminal 20, such as sensors or the payment interfaces that interact with the various types of payment devices, and test the operation of software components. Although particular monitoring components may be described with respect to certain embodiments of the present disclosure, it will be understood that a monitoring component may include any suitable mechanical components, sensors, switches, hardware, processing units, or any other suitable components necessary to monitor information about components of payment terminal 20. The memory analysis instructions 134 may include instructions for operating monitoring components. For example, memory analysis instructions 134 may include instructions to provide, either directly or via the application processing unit 72, power, test signals, and other suitable signals to the monitoring components. In some embodiments, memory analysis instructions 134 may provide instructions to control communication with one or more monitoring components or applications, to provide control messages to the monitoring components, receive data from memory 74, or perform any other suitable functions with the monitoring components. In some embodiments, operating the monitoring components may include providing signals such as test signals or test waveforms to one or more of the monitoring components. In one embodiment, the memory analysis instructions 134 can provide instructions for the monitoring components to detect parameters, either individually or in combination, rise-time signatures, spectral values, signal transients, hardware impairments, channel characteristics, power values, signal strength, identity of signals (e.g., in terms of frequency or phase), timing parameters associated with the signals, and the like, to obtain physical and operational characteristics of the payment terminal 20 and the applications executed on the payment terminal 20.

The monitoring components may interface with monitoring component circuitry that may include signal conditioning circuitry, control circuitry, analog-to-digital conversion circuitry, digital-to-analog conversion circuitry, circuitry for measuring inductance or capacitance, timing measurement circuitry, any other suitable circuitry, or any combination thereof. Using information from the monitoring components, the memory analysis instructions 134 are able to monitor values such as current, voltage, impedance, and capacitance, via corresponding values stored in memory 74, to determine whether a component of the payment terminal 20 is acting in an abnormal manner. In one embodiment, the monitoring components may also send test requests, for example, on an input/output line of the chip card interface 92 for an EMV card. The monitoring components may then measure electrical characteristics of the test signal, which may be indicative of a counterfeit card or a tamper device on the input/output line.

The memory analysis instructions 134 may include instructions for identifying tamper attempts and other attacks on payment terminal 20 based on information from monitoring components or software applications. The memory analysis instructions 134 may access memory 74 and perform actions such as performing test operations with applications, processing monitoring signals received from monitoring components, monitoring messages exchanged with a payment device (e.g., an EMV chip card 14), sending request messages to test for fraud or tampering, processing response messages received in response to the request messages, identifying fraud or tampering based on test criteria stored in evaluation criteria 136, communicating information that relates to fraud or tampering to a payment server 40 (e.g., payment service system 50), receiving tamper determination messages from a payment server 40 (e.g., payment service system 50), and taking corrective action based on the local test criteria and the tamper determination messages.

In some embodiments, memory analysis instructions 134 may provide instructions to process monitoring signals stored in memory 74. Monitoring signals may be stored in memory 74 (e.g., via monitoring component circuitry) in a variety of forms, including signals representing analog values, digital signals, data signals, etc. Tamper detection instructions 134 may provide instructions for processing unit 120 to extract useful data from the received monitoring signals. In some embodiments, extracting useful data may include measuring some aspect of the monitored signal, such as voltage, current, impedance, capacitance, power, energy, waveform shape, etc. In some embodiments, the monitored signal may be analog or may be converted into a digital signal by an analog-to-digital converter. In some embodiments, memory analysis instructions 134 may provide instructions for communicating with a monitoring component by exchanging data, for example, by communicating with monitoring components such as sensors over a data line or communication bus.

In some embodiments, memory analysis instructions 134 may provide instructions to monitor messages exchanged with a payment device 10 via NFC interface 98 or chip card interface 92. For example, messages may be exchanged with an EMV chip card 14 via chip card interface 92. Application processing unit 72 may generate and receive the messages that are exchanged with the payment device 10 and store the messages in memory 74. The memory analysis instructions 134 may include instructions for monitoring the exchanged messages stored in memory 74 and aspects of those messages, such as their content, sequence, and timing. In some embodiments, the messages may be monitored along with information received from one or more of the monitoring components.

In some embodiments, memory analysis instructions 134 may provide instructions to send request messages to test for fraud or tampering at interfaces and/or applications executed by the application processing unit. Rather than merely monitor the normal message flow during a payment transaction, memory analysis instructions 134 may provide instructions for application processing unit 72 or memory scanning system 100 to send request messages that are used to test for tamper devices and counterfeit cards, which may respond differently than properly functioning cards in response to atypical messages. In some embodiments, additional messages (e.g., error condition test requests) may be inserted into the normal messaging scheme for exchanging payment information between a payment device 10 and the payment terminal 20. In other embodiments, messages that do not comply with the messaging protocol (e.g., error condition test requests) may be transmitted to the payment object 10. EMV cards that have not been compromised may have known behaviors (e.g., based on the card issuer or manufacturer).

In some embodiments, memory analysis instructions 134 may provide instructions for messages to be sent to test the functioning of the underlying circuitry of the payment device 10. For example, numerous requests (e.g., random number test requests) may be made for information that includes random numbers. The results may then be tested by the memory analysis instructions 134 for randomness. As another non-limiting example, numerous requests may be made in succession, which may test the processing speed and capability of a chip card (e.g., message timing test requests), with any abnormal results likely to correspond to a counterfeit card or tamper device.

In some embodiments, memory analysis instructions 134 may provide instructions to process response messages received in response to the request messages. For example, response messages may be associated with a timestamp (e.g., based on data acquired by a monitoring component or based on timing established by message content or by application processing unit 72). In some embodiments, data such as a random number may be extracted from the message, or response messages may be associated with request messages.

In one embodiment, the memory analysis instructions 134 can generate a fingerprint or baseline (i.e., a pre-set value or test criteria) for one or more parameters and/or configurations of an application, process, operating system, payment interface or other component of payment terminal 20 based on information obtained from memory 74 and then store the fingerprint or baseline information in the evaluation criteria 136. The memory analysis instructions 134 can then perform subsequent (e.g., after completing a payment transaction) measurements and/or determinations of the same parameters based on new information obtained from memory 74 via the memory access controller 132 and compare the subsequent measurements and determinations to the fingerprint or baseline stored in evaluation criteria 136 to detect for a tamper attempt (e.g., the connection of a tamper device). If the fingerprint and subsequent measurements and/or determinations do correspond, the memory analysis instructions 134 can determine that a tamper attempt has not occurred and the payment terminal 20 is operating appropriately. However, if the fingerprint and subsequent measurements and/or determinations do not correspond, the memory analysis instructions 134 can determine that a tamper attempt has occurred. The memory analysis instructions 134 can then implement remedial measures in response to the determination that a tamper attempt has occurred.

In some embodiments, memory analysis instructions 134 may provide instructions that cause the memory scanning system 100 to communicate information that relates to fraud or tampering to a payment server 40 (e.g., payment service system 50), via the network stack 90 and network 30. The memory analysis instructions 134 may acquire data from the memory and acquire other information such as signals and data, from monitoring components. In some embodiments, local test criteria stored in evaluation criteria 136 may be used to determine fraud or a tamper attempt locally at the payment terminal 20. In other embodiments, some or all of the fraud and tamper detection may be performed remotely from the payment terminal 20 based on information gathered by the memory analysis instructions 134. Thus, in some embodiments a server request message may be generated by the memory analysis instructions 134 and sent to the payment server 40 (e.g., payment service system 50).

The server request message may include suitable information such as memory values, statistics for the memory, information obtained from applications, monitored signals from sensors and interfaces, information about the payment terminal (e.g., location, etc.), environmental information (e.g., temperature, etc.), preliminary assessments based on local test criteria, and any suitable combination thereof. In some embodiments, the server request message may only be sent if the local test criteria indicate that there is likely to be a fraudulent transaction or tamper attempt, for a subset of local test criteria, or based on the severity of a possible fraudulent transaction or tamper attempt. The payment server 40 can store the data received from the payment terminal 20 to a database.

The information stored in the database from the server request message may be compared to server test criteria to determine whether a fraudulent transaction or tamper attempt is occurring. In some embodiments, the server test criteria may include the test criteria described above with respect to the local test criteria, as well as additional test criteria involving comparisons with related transactions, concurrent transactions, previous transactions, similar devices, and other related information that can be aggregated from multiple sources. In some embodiments, server test criteria may be dynamic (e.g., utilizing dynamic thresholds) such that they may be regularly updated based on recent data acquired from payment terminal 20 and other payment terminals 20. The server test criteria may also involve a comparison to similar data from other concurrent or recent transactions, which may allow for detection of patterns of fraudulent activity that may not be readily identified at a single payment terminal. In addition to data received from payment terminal 20 in server request messages, other suitable information such as the results of the server test criteria and suggested corrective action may be stored in the database.

In some embodiments, memory analysis instructions 134 may provide instructions to receive fraud determination messages from a payment server 40 (e.g., payment service system 50). A payment server 40 (e.g., payment service system 50) may utilize the information provided in server request messages to determine whether a fraudulent transaction or tamper attempt is occurring, and may respond with a fraud determination message (e.g., by transmitting the fraud determination message to payment terminal 20 via network 30). Memory analysis instructions 134 may cause processing unit 120 of memory scanning system 100 to extract information from the fraud determination message, such as an indication that a fraudulent transaction or tamper attempt is occurring, information about the type of fraudulent transaction or tamper attempt, and instructions regarding a type of corrective action to perform.

In some embodiments, memory analysis instructions 134 may provide instructions for taking corrective action based on the local test criteria and/or the fraud determination message. Although any suitable corrective action may be taken, in some embodiments corrective action may include aborting a transaction (e.g., ceasing communications with a payment device 10), temporarily or permanently removing power or disabling one or more components of the payment terminal 20 (e.g., using tamper protection circuitry, security circuitry, or electronic fuses), querying the payment device 10 (e.g., sending request messages) to gather additional information about the fraudulent transaction or tamper attempt, erasing memory locations, modifying the operation of applications, or employing countermeasures.

APU interface instructions 138 may include instructions for interacting with the application processing unit 72. In one embodiment, the application processing unit 72 may be executing a point-of-sale application. The APU interface instructions 138 may include instructions for a complementary application to execute on processing unit 120 of memory scanning system 100, in order to exchange information with the point-of-sale application executed by the application processing unit 72. At an appropriate time during a transaction (e.g., a payment transaction), the point-of-sale application may send a message to the memory scanning system 100. In one embodiment, the APU interface instructions 138 can include a variety of message types and messages for communicating with the application processing unit 72.

In one embodiment, memory scanning system 100 may perform other suitable processing operations and may exchange additional information and messages with the application processing unit 72. In some embodiments, some or all of the functionality described herein with respect to the memory scanning system 100 and/or the server may be performed by the application processing unit 72, for example, by a point-of-sale application executing at the application processing unit 72. The memory scanning system 100 may perform functionality relating to cryptography and other security-specific functionality in order to support operations involving encrypted communications between a mobile device and a remote server. The communications may be encrypted based on keys stored at the memory scanning system 100 and the remote server, essentially protecting the underlying information from the application processing unit 72 or other intermediary devices and networks in the payment terminal 20. In an embodiment, the application processing unit 72 can provide any suitable data to the memory scanning system 100 for cryptographic processing and/or to perform parallel processing.

In an embodiment, the memory scanning system 100 may include a cryptographic processing unit (not shown in FIG. 4) for handling cryptographic processing operations. For example, the cryptographic processing unit can be used to provide for encrypted communications between the memory scanning system and the payment server 40. In one embodiment, the encrypted communications may be sent directly to the payment server 40 by the memory scanning system 100 using information obtained from the network stack 90. In other embodiments, the memory scanning system 100 may use the application processing unit 72 as an intermediary for the encrypted communications with the payment server. In additional embodiments, the memory scanning system 100 may communicate directly with the application processing unit 72 (e.g., a point of sale application running thereon) which may perform some or all of the operations described herein as being performed on the payment server 40. Note that the cryptographic processing unit may have dedicated cryptographic memory (not shown in FIG. 4) associated with the cryptographic processing unit. In this manner, specific cryptographic processing and critical security information (e.g., cryptographic keys, passwords, user information, etc.) may be securely stored by cryptographic memory and processed by cryptographic processing unit.

The cryptographic processing unit may be any suitable processor, and, in some embodiments, may perform cryptographic functions for the processing of payment transactions and for other purposes such as the sending of confidential documents and email. For example, in some embodiments a cryptographic processing unit may encrypt and decrypt data based on one or more encryption keys stored in the cryptographic memory, in a manner that isolates the encryption functionality from other components of payment terminal 20 and protects the encryption keys from being exposed to other components of payment terminal 20. In one embodiment, the encryption keys can be permanently stored in cryptographic memory at the time of manufacture of the memory scanning system 100 and are not updateable. In some embodiments, cryptographic memory may be any suitable memory or combination thereof, and may include a plurality of sets of instructions for performing cryptographic operations, such as cryptographic instructions. Cryptographic instructions may include instructions for performing cryptographic operations. Cryptographic processing unit may execute the cryptographic instructions to perform a variety of cryptographic functions, such as to encrypt, decrypt, sign, or verify a signature upon payment and transaction information as part of a payment transaction.

In view of the structures and devices described supra, methods that can be implemented in accordance with the disclosed subject matter will be better appreciated with reference to the flowcharts of FIGS. 5 and 6. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 5 depicts a non-limiting flow diagram illustrating exemplary steps for scanning and analyzing the memory 74 of a payment terminal 20 in accordance with some embodiments of the present disclosure. In some embodiments, the memory scanning system 100 can directly scan the memory 74 of the payment terminal 20 to determine if a fraudulent transaction or tamper attempt is occurring (or has occurred) at the payment terminal 20 such that the payment terminal 20 cannot be considered secure or trusted. In one embodiment, the scanning and analyzing of the memory 74 by the memory scanning system 100 can be part of a remote attestation process with the payment server 20 such that the payment server can be considered secure or trusted when processing payment transaction with the payment server 40.

At step 502, the memory analysis instructions 134 can provide instructions to the memory access controller 132 to scan (or access) the memory 74 of the payment terminal 20. The memory analysis instructions 134 can provide instructions to the memory access controller 132 to obtain specific information from the memory 74 based on particular test criteria or other requirements being implemented by the memory analysis instructions 134. At step 504, the memory access controller 132 can obtain the corresponding information from the memory 74 based on the instructions from the memory analysis instructions 134. As discussed above, the memory access controller 132 can directly access information in memory 74 to obtain the corresponding information for the particular test criteria of requirements for the memory analysis instructions 134.

Once the memory analysis instructions 134 receive the corresponding information from the memory access controller 132, the memory analysis instructions 134 can access corresponding pre-set values and/or test criteria from the evaluation criteria 136 and compare the obtained information to the corresponding evaluation criteria 136 at step 506. At step 508, the memory analysis instructions 134 can make a determination as to whether there is a discrepancy (e.g., the obtained information does not satisfy a corresponding test criteria in the evaluation criteria 136) between the evaluation criteria 136 and the corresponding obtained information. If no discrepancy is determined by the memory analysis instructions 134, the process can return to step 502 to scan the memory 74 in response to instructions from the memory analysis instructions 134. In one embodiment, the memory analysis instructions 134 can also send a message to payment server 40 indicating that no discrepancy was detected between the obtained information and the test criteria in evaluation criteria 136. The message to the payment server 40 can be a confirmation by the memory scanning system 100 that the payment terminal is secure or trusted. However, if a discrepancy is determined between the obtained information and the evaluation criteria in step 508, the process proceeds to step 510. The determination of a discrepancy at step 508 may be an indication of the operating instructions 75 or an application in memory 74 is performing forbidden or unauthorized operations which can be an indicator of a fraudulent transaction or tamper attempt the payment terminal 20.

At step 510, in response to the determination of a discrepancy in the information stored in memory 74, the memory scanning system 100 can initiate an appropriate response action and the process ends. In one embodiment, the memory scanning system 100 can implement a corresponding remedial or corrective action such as aborting a transaction (e.g., ceasing communications with a payment device 10), modifying the execution of applications, temporarily or permanently removing power or disabling one or more components of the payment terminal 20 (e.g., using tamper protection circuitry, security circuitry, or electronic fuses), querying the payment device 10 (e.g., sending request messages) to gather additional information about the fraudulent transaction or tamper attempt, or employing countermeasures (e.g., utilizing security circuitry to switch a high current to the I/O line of the payment object 10 via chip card interface 92) in an attempt to damage the counterfeit card or tamper device. In other embodiments, the memory scanning system 100 can send a message to the payment server 40 indicating that a discrepancy was detected and that the payment terminal 20 is not secure or trusted. In a further embodiment, the memory scanning system 100 can send the message indicating a discrepancy along with the obtained information from memory 74 that resulted in the discrepancy determination. The payment server 40 can then analyze the information in the message using server test criteria to determine if a fraudulent transaction or tamper attempt is occurring at the payment terminal 20. If a fraudulent transaction or tamper attempt is occurring at the payment terminal 20, the payment server 40 can send a response message to the payment terminal 20 instructing the memory scanning system 100 to take remedial or corrective action. In addition, the payment server 40 can designate the payment terminal 20 as unsecure or untrusted as a result of the determination that a fraudulent transaction or tamper attempt is occurring at the payment terminal 20.

FIG. 6 depicts a non-limiting flow diagram illustrating exemplary steps for updating evaluation criteria 136 for the memory scanning system 100 in accordance with some embodiments of the present disclosure. In an exemplary embodiment, evaluation criteria 136 may be updated at payment processing system 50 of payment server 40 based on information received from one or more payment terminals 20. In some embodiments, the evaluation criteria 136 used by the memory analysis instructions 134 to determine possible discrepancies in the operation of the payment terminal 20 can be updated by the payment server 40, as necessary. As discussed above, the memory analysis instructions 134 use the information in evaluation criteria 136 to determine if a fraudulent transaction or tamper attempt is occurring at the payment terminal 20. Thus, the evaluation criteria 136 can be updated by the payment server 40 to enable the memory analysis instructions 134 to more effectively identify possible fraudulent transactions or tamper attempts at the payment terminal 20.

The process of FIG. 6 begins at step 602 with the memory scanning system 100 accessing information directly from memory 74 that can be used to determine if a fraudulent transaction or tamper attempt is occurring at the payment terminal 20. The memory analysis instructions 134 can provide instructions to the memory access controller 132 to obtain specific information from the memory 74 based on particular test criteria or other requirements being implemented by the memory analysis instructions 134. As discussed above, the memory access controller 132 can directly access information in memory 74 to obtain the corresponding information for the particular test criteria of requirements for the memory analysis instructions 134. Once the memory analysis instructions 134 receives the corresponding information from the memory access controller 132, the memory analysis instructions 134 can generate one or more messages to provide the information from memory 74 to the payment server 40 in step 604. In one embodiment, the message to the payment server 40 can be a server request message as described above. In another embodiment, the memory analysis instructions 134 can take the obtained information and provide it directly to the payment server 40 without performing any analysis or processing of the information. In still other embodiments, the memory analysis instructions 134 can evaluate the obtained information in view of the corresponding values or test criteria stored in evaluation criteria 136. The memory analysis instructions 134 can then send the payment server 40 a message with the obtained information and the evaluation of the obtained information by the memory analysis instructions 134.

The payment server 40 can receive the message with the obtained information (and the evaluation of the information, if performed) and store the information in a database. In one embodiment, the message from the memory scanning system 100 can include information such as application information, monitored electrical characteristics, monitored timing, monitored responses, transaction information, information about the payment terminal (e.g., location, etc.), environmental information (e.g., temperature, etc.), statistics determined therefrom, and preliminary assessments based on local test criteria. The payment server 40 can then analyze or process the information in the database and determine the appropriate evaluation criteria to be used by the memory scanning system 100. The payment server 40 can incorporate the new evaluation criteria in a message and send the message to the memory scanning system 100.

In one embodiment, payment server 40 can collect information from multiple payment terminals. As more information about fraudulent transactions and tamper attempts is collected at the server database, this information may be used to generate the new evaluation criteria. In addition, the payment server 40 may receive feedback from other systems, such as whether the payment transaction was improperly denied (a false positive) or improperly accepted (a false negative). The feedback information may also be used to update the evaluation criteria.

In some embodiments, machine learning techniques may be used to analyze the data. It will be understood that the availability of this large volume of information relevant to fraudulent transactions and tamper attempts enables complex analyses that improve the responsiveness of the payment server 40. In some embodiments, patterns that result in fraudulent transactions may be identified based on the information stored at the server database, and evaluation criteria may be updated based on the identification. In addition, feedback information with false positives and false negatives may be used to identify evaluation criteria that should be modified. Information such as the severity of fraudulent transactions and tamper attempts or the likelihood that particular information (e.g., memory status, memory statistics, application information, electrical characteristics, monitored responses, monitored timing, payment terminal information, environmental information, etc.) resulted in a fraudulent transaction or tamper attempt may be used to determine evaluation criteria, as well as the type of corrective action that should be taken. By fine tuning evaluation criteria used by the payment terminal 20, the evaluation criteria can be dynamically calibrated to avoid false positives (e.g., false determinations that a transaction is fraudulent or that a tamper attempt is occurring) while capturing new types of attacks or improved attacks. Payment server 40 may determine that certain data captured by payment terminal 20 is highly likely to be the result of a fraudulent transaction or tamper attempt, and generate evaluation criteria accordingly. The evaluation criteria may then be updated via an update message. Payment server 40 may similarly update the server test criteria.

In step 606, the memory scanning system 100 can receive the message with the updated evaluation criteria from the payment server 40. After receiving the message from the payment server 40, the memory scanning system 100 can update the evaluation criteria 136 stored in memory 122 to correspond to the new evaluation criteria from the message in step 608 and the process ends. In one embodiment, the memory scanning system 100 may selectively replace portions of the evaluation criteria 136 to update only the portions of the evaluation criteria that have changed. In other embodiments, the memory scanning system 100 can replace the evaluation criteria 136 with the new evaluation criteria in the message from the payment server. In further embodiments, if the payment server 40 does not have any changes to the evaluation criteria, the payment server 40 may send a message to the memory scanning system 100 indicating that no changes are needed.

In an embodiment, evaluation criteria 136 may be updated by other methods (e.g., by insertion of a memory device into a port of the payment terminal 20 or any other suitable manner for providing updates). Memory scanning system 100 may receive the update and update the evaluation criteria 136. Evaluation criteria 136 may also change based on local conditions, which may be determined based on any suitable inputs (e.g., time, location, presence of a network connection, etc.). For example, the evaluation criteria 136 may be modified (e.g., strengthened) if a payment terminal 20 is not connected to a network, and thus cannot communicate with a payment server 40 to receive fraud determination messages.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A secure transaction processing device including an integrated memory scanning microprocessor, comprising:
at least one processing unit having an operational processing portion;
at least one memory having an operational memory portion,
wherein the operational memory portion comprises application instructions, operating system instructions, and system memory,
wherein the operating system instructions cause the operational processing portion to execute an operating system on the operational processing portion, and wherein the operating system instructions cause the operational processing portion to update operating system values within the system memory, and
wherein the application instructions cause the operational processing portion to execute one or more applications on the operational processing portion, and wherein the application instructions cause the operational processing portion to update application values within the system memory; and
a memory scanning microprocessor including a secure processing portion and a secure memory portion,
wherein the secure processing portion and the secure memory portion are physically and logically protected from tamper attempts,
wherein the secure processing portion has direct read access to the operational memory portion, and
wherein the secure memory portion comprises instructions that cause the secure processing portion to:
access at least a portion of the operating system values via the direct read access,
access at least a portion of the application values via the direct read access,
compare the operating system values and the application values to a plurality of test criteria;
determine, based on the comparison, that one of the application instructions or the operating system instructions is performing forbidden operations, and
send a message to an external device via a network stack in the operational memory portion in response to the determination that one of the application instructions or the operating system instructions is performing forbidden operations.

2. The secure transaction processing device of claim 1, wherein the secure memory portion comprises instructions that cause the secure processing portion to initiate a response action in response to the determination that one of the application instructions or the operating system instructions is performing forbidden operations.

3. The secure transaction processing device of claim 1, wherein the memory scanning microprocessor is directly connected to the operational memory portion.

4. The secure transaction processing device of claim 1, wherein the plurality of test criteria is stored in the secure memory portion.

5. A secure transaction processing device for performing an integrated operational security test, comprising:
at least one processing unit having an operational processing portion and a secure processing portion; and
at least one memory having an operational memory portion and a secure memory portion,
wherein the secure processing portion and the secure memory portion are physically and logically protected from tamper attempts,
wherein the secure processing portion has direct read access to the operational memory portion, wherein the operational memory portion comprises system instructions and system memory, wherein the system instructions cause the operational processing portion to execute one or more processes on the secure transaction processing device, and wherein the system instructions cause the operational processing portion to update system values within the system memory, and wherein the secure memory portion comprises memory analysis instructions, and wherein the memory analysis instructions cause the secure processing portion to:

access at least a portion of the system values via the direct read access, compare the accessed system values to corresponding evaluation criteria;

determine, based on the comparison, whether there is a discrepancy between the system values and the evaluation criteria, and initiate a response action based on the determination.

6. The processing device of claim 5, wherein the memory analysis instructions cause the secure processing portion to prevent processing of transactions based on the determination.

7. The processing device of claim 5, wherein the secure processing portion is directly connected to the operational memory portion to access the operational memory portion via direct memory access.

8. The processing device of claim 5, wherein:

the system instructions comprise application instructions and operating system instructions, wherein the operating system instructions cause the operational processing portion to execute an operating system on the secure transaction processing device, and wherein the operating system instructions cause the operational processing portion to update operating system values within the system memory, and wherein the application instructions cause the operational processing portion to execute one or more applications on the secure transaction processing device, and wherein the application instructions cause the operational processing portion to update application values within the system memory; and the memory analysis instructions cause the secure processing portion to:

access at least a portion of the operating system values via the direct read access, access at least a portion of the application values via the direct read access, compare the operating system values and the application values to the evaluation criteria, determine, based on the comparison, a discrepancy between at least one of the operating system values and the application values and the evaluation criteria, and prevent processing of transactions based on the determination.

9. The processing device of claim 8, wherein the evaluation criteria includes a plurality of test criteria and wherein the discrepancy between at least one of the operating system values and the application values and the evaluation criteria indicates that one of the application instructions or the operating instructions is performing forbidden operations.

10. The processing device of claim 9, wherein the memory analysis instructions cause the secure processing portion to send a message via a networking stack in the operational memory portion in response to the determination that one of the application instructions or the operating system instructions is performing forbidden operations.

11. The processing device of claim 5, wherein the at least one processing unit comprises an application processing unit, wherein the operational processing portion is included in the application processing unit and wherein the application processing unit is coupled to the operational memory portion.

12. The processing device of claim 11, wherein the application processing unit comprises a secure enclave, wherein the secure processing portion and the secure memory portion are included within the secure enclave, and wherein the memory analysis instructions are executed within the secure enclave.

13. The processing device of claim 11, wherein the secure processing portion and the secure memory portion are included within the application processing unit, and wherein the secure processing portion and the secure memory portion are physically and logically separated from the operational processing portion.

14. The processing device of claim 11, further comprising a memory scanning system separate from the application processing unit, wherein the secure processing portion and the secure memory portion are included within the memory scanning system.

15. The processing device of claim 14, wherein the memory scanning system comprises a memory access controller to access the operational memory portion in response to instructions from the memory analysis instructions.

16. The processing device of claim 14, wherein the memory scanning system is electrically connected to the application processing unit, and the memory scanning system comprises a serial interface to communicate with the application processing unit via the electrical connection.

17. The processing device of claim 5, wherein the evaluation criteria is stored in the secure memory portion.

18. The processing device of claim 17, wherein the memory analysis instructions cause the secure processing portion to update the evaluation criteria in response to a message from a payment server with new evaluation criteria.

19. The processing device of claim 5, wherein the memory analysis instructions cause the secure processing portion to transmit a message to a payment server with the accessed system values and the determination.

20. The processing device of claim 19, wherein the memory analysis instructions cause the secure processing portion to receive a message from the payment server and to prevent processing of transaction in response to the received message.

21. A method of performing a security test at a payment terminal, the method comprising:

processing information with a processing unit of the payment terminal;

storing, by the processing unit, the information in memory of the payment terminal;

providing a direct connection between the memory and a memory scanning system of the payment terminal, the memory scanning system including a secure processing portion and a secure memory portion that are physically and logically protected from tamper attempts;

scanning, by the memory scanning system, the memory via direct memory access using the direct connection;

obtaining, by the memory scanning system, at least a portion of the information in the memory based on the scanning;

comparing, by the memory scanning system, the obtained information to corresponding evaluation criteria stored by the memory scanning system;

determining, by the memory scanning system, whether there is a discrepancy between the obtained information and the evaluation criteria; and initiating, by the memory scanning system, a response action in response to the determination of a discrepancy between the obtained information and the evaluation criteria.

22. The method of claim 21, further comprising transmitting, by the memory scanning system, a message to a payment server in response to the determination of a discrepancy between the obtained information and the evaluation criteria, wherein the message includes the obtained information and the determination of a discrepancy.

23. The method of claim 22, further comprising:

receiving, by the memory scanning system, a response message from the payment server indicating tampering at the payment terminal; and preventing, by the memory scanning system, processing of transactions in response to the response message.

24. The method of claim 21, further comprising:

receiving, by the memory scanning system, a message from the payment server with new evaluation criteria; and updating, by the memory scanning system, the stored evaluation criteria with new evaluation criteria.

25. The method of claim 21, wherein obtaining information in memory includes obtaining information about an operating system of the payment terminal.

26. The method of claim 21, wherein the evaluation criteria include a plurality of test criteria.

27. The method of claim 21, wherein the determination of a discrepancy between the obtained information and the evaluation criteria indicates that the payment terminal is performing forbidden operations.

28. The method of claim 21, wherein scanning the memory includes accessing the memory with a memory access controller of the memory scanning system.

29. The method of claim 21, wherein payment terminal comprises an application processing unit and the memory scanning system is incorporated within the application processing unit.

30. The method of claim 21, wherein payment terminal comprises an application processing unit and the memory scanning system is incorporated in a separate module from the application processing unit.

* * * * *